(12) United States Patent
Rinaldi et al.

(10) Patent No.: US 11,933,205 B2
(45) Date of Patent: Mar. 19, 2024

(54) FLUID SUMP FOR ACCOMMODATING A LUBRICATING FLUID

(71) Applicant: DANA ITALIA S.R.L., Arco (IT)

(72) Inventors: Pier Paolo Rinaldi, Arco (IT); Nicoletta Gioia, Strembo (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/364,702

(22) Filed: Jun. 30, 2021

(65) Prior Publication Data
US 2022/0003135 A1 Jan. 6, 2022

(51) Int. Cl.
*F01M 11/00* (2006.01)
*F16H 57/04* (2010.01)

(52) U.S. Cl.
CPC ..... *F01M 11/0004* (2013.01); *F16H 57/0409* (2013.01); *F16H 57/0443* (2013.01); *F16H 57/0447* (2013.01); *F16H 57/0453* (2013.01); *F01M 2011/0041* (2013.01); *F01M 2011/0058* (2013.01)

(58) Field of Classification Search
CPC ............. F16H 57/0443; F16H 57/0447; F16H 57/0453; F16H 57/0409; F16N 29/02; F01M 2011/0041
See application file for complete search history.

(56) References Cited

U.S. PATENT DOCUMENTS

| | | | |
|---|---|---|---|
| 2,743,627 A | | 5/1956 | Christenson |
| 3,800,913 A | * | 4/1974 | Schmitt .................... F01M 1/12 |
| | | | 74/606 R |
| 4,630,711 A | * | 12/1986 | Levrai ....................... F16N 7/28 |
| | | | 184/6.12 |
| 7,841,449 B2 | * | 11/2010 | Nakamura .......... F16H 57/0447 |
| | | | 184/6.12 |
| 7,900,535 B2 | | 3/2011 | Usami et al. |
| 8,672,094 B2 | * | 3/2014 | Quehenberger .... F16H 57/0457 |
| | | | 184/6.12 |
| 9,927,020 B2 | * | 3/2018 | Keeney ................. F16H 57/037 |
| 2009/0020366 A1 | * | 1/2009 | Mori ................... F01M 11/0004 |
| | | | 184/106 |

(Continued)

FOREIGN PATENT DOCUMENTS

| | | | | |
|---|---|---|---|---|
| DE | 3316117 C2 | * | 5/1983 | ......... F16H 57/0421 |
| DE | 102011082185 A1 | * | 3/2013 | ............. B60K 6/405 |

(Continued)

*Primary Examiner* — Minh Truong
(74) *Attorney, Agent, or Firm* — McCoy Russell LLP

(57) ABSTRACT

A fluid sump for accommodating a lubricating fluid and transmission housing for a vehicle comprising such a fluid sump. The fluid sump may comprise a first compartment for collecting the lubricating fluid, a second compartment in which the lubricating fluid can be brought in contact with a rotating member, and an intermediate compartment having a first opening for introducing the lubricating fluid from the first compartment into the intermediate compartment, a second opening for introducing the lubricating fluid from the intermediate compartment into the second compartment, and a floating element. In one or more examples, the first opening can be opened and closed by the floating element, and the first compartment, the intermediate compartment and the second compartment are provided with ambient pressure.

12 Claims, 5 Drawing Sheets

(56) References Cited

U.S. PATENT DOCUMENTS

2014/0026988 A1* 1/2014 Peterson ............. F16H 57/0447
137/544
2020/0309245 A1* 10/2020 Kuramoto ........... F16H 57/0435

FOREIGN PATENT DOCUMENTS

| DE | 102013113748 A1 * | 6/2014 | ......... F16H 57/0413 |
| DE | 102016214754 A1 * | 2/2018 | ............ F16H 57/04 |
| DE | 102017203781 A1 * | 9/2018 | |
| DE | 102019218418 A1 * | 6/2021 | |
| DE | 102020210863 A1 * | 3/2022 | |
| SE | 0950801 A1 * | 10/2009 | ............... F16N 7/26 |
| WO | WO-2008076061 A1 * | 6/2008 | ......... F16H 57/0447 |

* cited by examiner

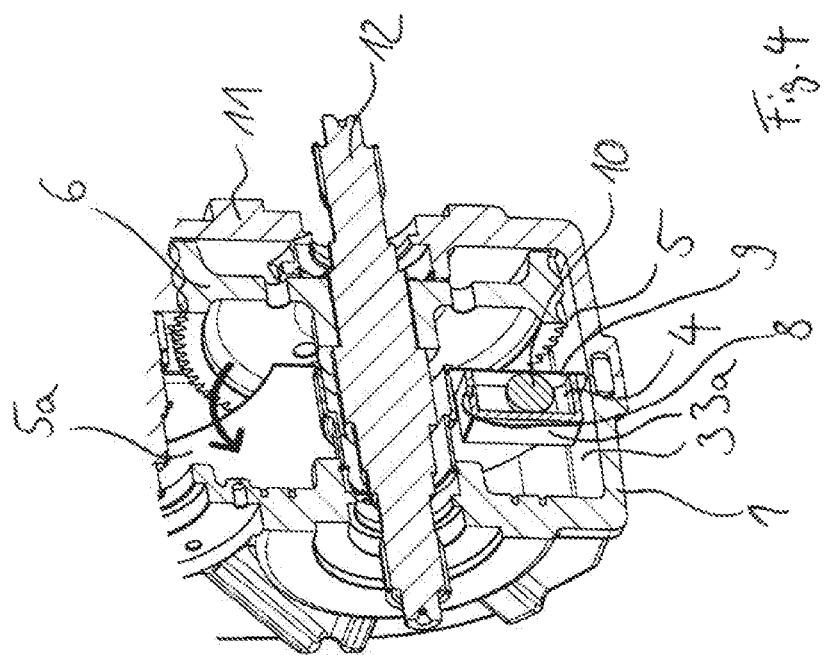

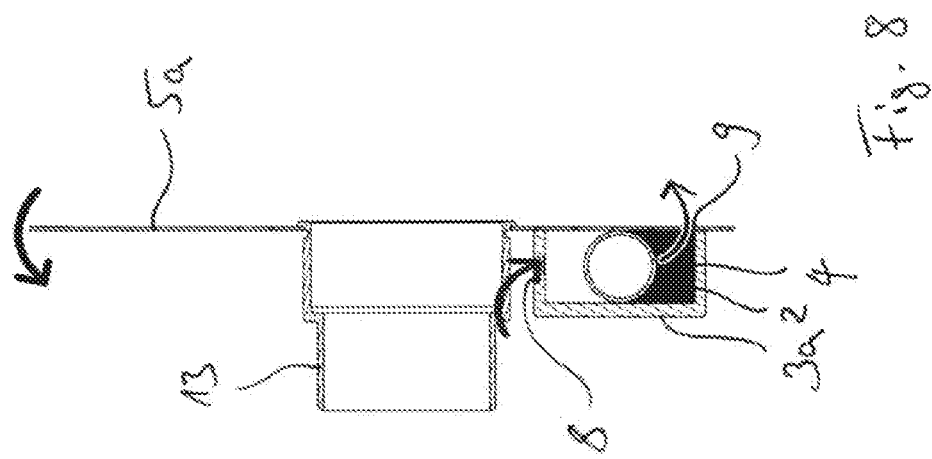
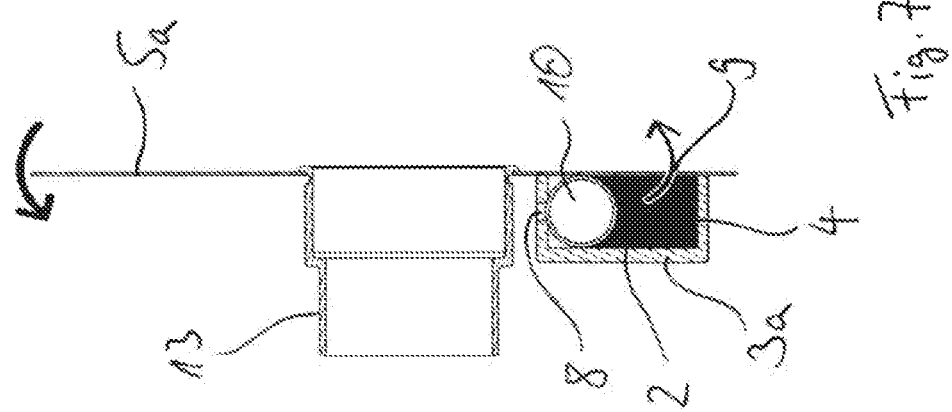

FLUID SUMP FOR ACCOMMODATING A LUBRICATING FLUID

CROSS-REFERENCE TO RELATED APPLICATION

The present application claims priority to German Utility Model Application Serial No. 20 2020 103 852.4, entitled "FLUID SUMP FOR ACCOMMODATING A LUBRICATING FLUID," and filed on Jul. 2, 2020. The entire contents of the above-listed application are hereby incorporated by reference for all purposes.

TECHNICAL FIELD

The present disclosure is related to a fluid sump for accommodating a lubricating fluid, for instance for use in an area of a vehicle transmission. The present disclosure is also related to a transmission housing for a vehicle transmission comprising a fluid sump.

BACKGROUND AND SUMMARY

Low cost transmissions usually rely on oil splashing to guarantee gears and bearings lubrication. Splash lubrication is a consolidated technology among off-highway vehicles. Minimal complexity together with high reliability are the main advantages of this lubrication arrangement. To guarantee a minimal lubrication flow at whichever slope the vehicle is operated, a certain draft must be assured to the lowest wheel. The subsequent churning and splashing are responsible for most of the transmission power losses. The trend to increase the driveline efficiency, mainly driven by electrification, is urging for an effective solution to lubrication related transmission power losses.

Decreasing oil viscosity can reduce power losses within the transmission, for instance those directly related to oil churning. Provided gears and bearings can cope with derated lubricant properties, a replacement of the original design oil with a less viscous one is the quickest way to increase transmission efficiency performance. The losses due to splashing constitute the kinetic energy that oil subtracts from the rotating shafts and that is completely transformed into heat once the oil has returned back to the sump. Indeed, the power losses due to oil splashing remains unaffected by the change in oil viscosity and can be reduced only by limiting the fluid that is scattered all around by rotating elements. The drawback is a possible lubricant starvation when the vehicle is driven in steep slopes. This is depicted in FIG. 1A showing a transmission housing 100 accommodating a lowest gear wheel 102 and which comprises a first amount of lubrication fluid up to a first fluid level 101. The gear wheel 102 is almost fully submerged in the lubrication fluid. The fluid amount is then reduced to a second fluid level 101 such that only a small part of the gear wheel 102 is submerged in the lubrication fluid. At a steep slope, the fluid level 101 falls below the lowest gear wheel 102 such that none of the rotating parts is contact with the lubrication fluid anymore. If the sump design is such that it envelops the lowest gear wheel of the transmission independently from an inclination of the vehicle oil starvation can avoided. However, reducing the oil level in this way, results in a tiny amount of lubricant in the sump only as shown in FIG. 1B. This small amount of oil is not consistent with a reasonably long service interval or with a good dilution of contaminating particles.

An object of the present disclosure is therefore to reduce an amount of lubrication oil that is splashed within splash lubrication without a need for replenishment of lubrication oil out of the usual service intervals and without having rapid contamination of the lubrication oil.

The object is achieved by the fluid sump disclosed herein. Further advantageous embodiments of the fluid sump are mentioned in the dependent claims.

The fluid sump according to the present disclosure for accommodating a lubricating fluid, for instance for use in an area of a vehicle transmission, comprises a first compartment for collecting the lubricating fluid, a second compartment in which the lubricating fluid can be brought in contact with a rotating member, and an intermediate compartment. The intermediate compartment has a first opening for introducing the lubricating fluid from the first compartment into the intermediate compartment, a second opening for introducing the lubricating fluid from the intermediate compartment into the second compartment, and a floating element, wherein the first opening can be opened and closed by the floating element. Moreover, the first compartment, the intermediate compartment and the second compartment are provided with ambient pressure.

The floating element thus acts as a valve between the first and the second compartment and allows only as much lubricating fluid as has been used in the second compartment for splash lubrication to flow from the first compartment into the intermediate compartment through the first opening and then into the second compartment through the second opening such that a basically constant low or minimal fluid level is kept in the second compartment. In this way, the lubricating fluid amount in the second compartment can be chosen as small as desired which reduces splash fluid and hence loss of kinetic energy of lubricated members. Simultaneously a larger amount of lubricating fluid is stored in the first compartment to dilute contamination particles and to replenish the second compartment as necessary. Hence, rapid contamination is prevented and the usual service intervals can be kept.

In some embodiments, the lubricating fluid may be a lubricating oil.

According to an advantageous embodiment, the fluid sump can further comprise a first partition wall separating the first and the intermediate compartment from one another and containing the first opening such that, upon regular use of the fluid sump, the lubricating fluid can pass the first opening in a basically vertical first flow direction.

According to a further advantageous embodiment, the fluid sump can further comprise a second partition wall separating the intermediate compartment and the second compartment from one another and containing the second opening such that, upon regular use of the fluid sump, the lubricating fluid can pass the second opening in a basically horizontal second flow direction.

According to a further advantageous embodiment, the second opening can be disposed within the second partition wall at a distance to the first opening which basically corresponds to a height of the intermediate compartment. In such an embodiment, the first opening can be disposed at a top of the intermediate compartment while the second opening can be disposed at a bottom of the intermediate compartment with respect to a regular use orientation. This guarantees that even if a fluid level in the intermediate compartment is low, a lubrication fluid flow into the second compartment is maintained.

According to a further advantageous embodiment, a diameter of the first opening can be smaller than or equal to 10 mm and/or larger than or equal to 4 mm, or smaller than or equal to 8 mm and/or larger than or equal to 6 mm, and/or can be basically larger than or equal to ⅙ and/or smaller than or equal to ¼ of a diameter or a width or a length of the floating element.

According to a further advantageous embodiment, a diameter of the second opening can be smaller than or equal to 10 mm and/or larger than or equal to 2 mm, or smaller than or equal to 8 mm and/or larger than or equal to 2.5 mm, or about 3.25 mm.

According to a further advantageous embodiment, dimensions of the intermediate compartment and the floating element can be defined such that a length and a width of the floating element is basically equal to an inner length and an inner width of the intermediate compartment. In this case, in the process of closing the first opening, the floating element is guided automatically by the first and second partition walls into the first opening and further holding or guiding members are dispensable.

The dimensions of the intermediate compartment as well as the first and second opening may be chosen such that at a given viscosity of the lubricating fluid a sufficient lubricating fluid flow from the first to the second compartment can be ensured for a sufficiently fast replenishment of the second compartment.

According to a further advantageous embodiment, the floating element can be ball-shaped or ellipsoid-shaped. In such an embodiment, when using a ball-shaped floating element guiding members may be dispensable for the process of closing the first opening.

According to a further advantageous embodiment, the fluid sump can further comprise a hollow tube which fluidly connects the intermediate compartment with the first and second compartment for equalizing a pressure within the intermediate compartment with ambient pressure. Thus, through the hollow tube the intermediate compartment is exposed to the same ambient pressure as the first and second compartment. In other words, the pressure acting on the free surface of the lubricating fluid in the three compartments is the same. A hydrostatic head in the intermediate compartment therefore only depends on a lubricating fluid level in the intermediate compartment.

According to a further advantageous embodiment, the fluid sump can further comprise a thermostatic valve disposed within the second opening for controlling a lubricating fluid flow from the intermediate compartment to the second compartment according to a lubricating fluid temperature. The thermostatic valve thus ensures a desired lubricating fluid flow behaviour or a desired constant lubricating fluid flow through the second opening independent from the lubricating fluid temperature.

According to a further advantageous embodiment, the intermediate compartment can have a length between 1.5 and 2 times a main dimension of the floating element and/or a width comparable to the main dimension of the floating element.

According to a further advantageous embodiment, the fluid sump can comprise sidewalls with stiffening ribs which are arranged to channel the lubricating fluid dripping along the sidewalls towards the first compartment.

The present disclosure also includes a transmission housing for a vehicle transmission comprising a fluid sump as described above. The fluid sump can form a bottom of the transmission housing.

According to a further advantageous embodiment, the transmission housing can accommodate gear wheels such that at least one of the gear wheels arranged next to a bottom of the second compartment of the fluid sump has a draft of less than 20 mm, or less than 15 mm or less than 10 mm within the lubrication fluid.

BRIEF DESCRIPTION OF THE FIGURES

In the following, certain embodiments of the fluid sump according to the present disclosure are described in more detail on the basis of the following figures. The described features are not only conceivable in the combinations of the disclosed embodiments, but can be realized independently of the concrete embodiments in various other combinations. In the figures, equal or similar features are denoted by equal or similar reference signs.

FIG. 3 shows a frontal view of a section of a gearbox comprising a fluid sump according to a second embodiment of the present disclosure.

FIG. 4 shows a perspective view of the section of FIG. 3.

FIGS. 7 and 8 show a working principle of the floating element of the fluid sump according to the second embodiment.

FIGS. 3-8 are shown approximately to scale.

DETAILED DESCRIPTION

Figure 1A:
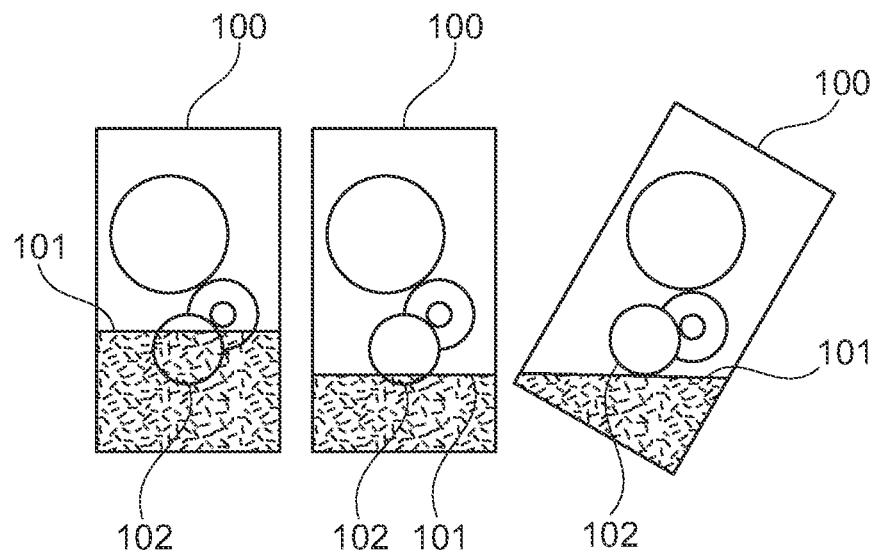
FIGS. 1A and 1B show fluid sumps as known in the prior art.
Figure 1B:
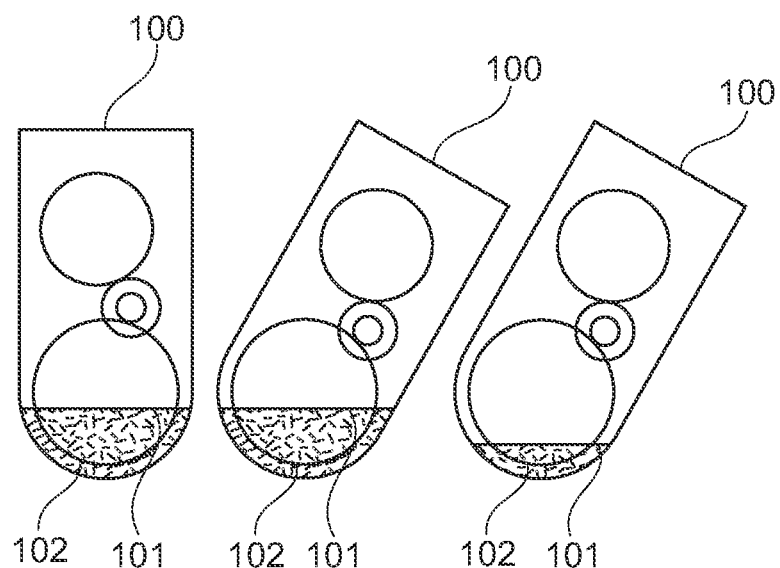
Figure 2A:
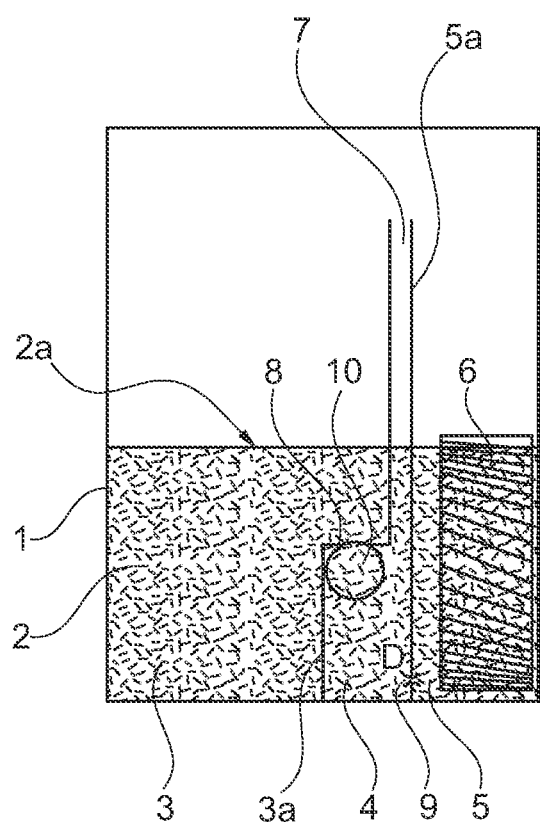
FIGS. 2A and 2B show a fluid sump according to a first embodiment of the present disclosure.
Figure 2B:
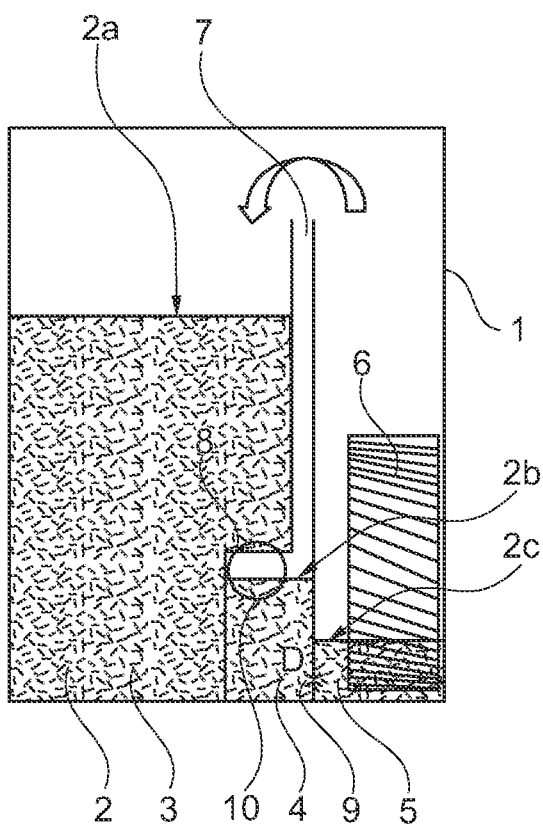

FIGS. 2A and 2B shows a fluid sump 1 according to a first embodiment of the present disclosure. To reduce splashing, a lubricating fluid level in the fluid sump should be as low as possible. Conversely, for the sake of cleanliness and to extend service intervals, it is advisable to fill the transmission with a significant amount of lubricating fluid. The present disclosure combines these two contrasting aspects: to keep wheels draft as low as possible while ensuring maximum lubricating fluid volume in the transmission.

As shown in FIG. 2A, the fluid sump 1 accommodates a lubricating fluid 2 up to a lubricating fluid level 2a. The fluid sump 1 is divided in three leaking compartments 3, 4, 5 which are separated by a first partition wall 3a and a second partition wall 5a. The first compartment 3 and the intermediate compartment 4 are separated by the first partition wall 3a whereas the intermediate compartment 4 and the second compartment 5 are separated by the second partition wall 5a. The first compartment 3 is basically used for collecting splash lubricating fluid while the second compartment is basically used to bring a lowest gear wheel 6, which is disposed near a bottom of the fluid sump 1 within the second compartment 5, in contact with the lubricating fluid 2. The first partition wall 3a comprises a first opening 8 at the top of the intermediate compartment 4 for introducing lubricating fluid 2 from the first compartment 3 into the intermediate compartment 4. Furthermore, the second partition wall 5a comprises a second opening 9 at the bottom of the intermediate compartment 4 for introducing lubricating fluid 2 from the intermediate compartment 4 into the second compartment 5. The fluid sump 1 further comprises a floating element 10 for opening and closing the first opening 8. Toward the top of the fluid sump 1 and above the lubricating fluid level 2a the first and the second partition wall 3a and 5a approach each other up to a thin gap which fluidly connects the intermediate compartment 4 with the first and second compartment 3 and 5. Pressures within all three compartments 3, 4, 5 can thus be equalized with one another and can be adapted to an ambient pressure.

As shown in FIG. 2A, when the transmission (represented here by the single depicted gear wheel 6) is not operated, a unique lubricating fluid level 2a can be obtained within fluid sump 1. This is very advantageous during service where the transmission can be completely emptied, and a desired lubricating fluid level can be checked by a spillway cap or a dipstick. This enables to adjust/monitor the lubricating fluid level as in a traditional transmission.

When the transmission is operated, the submerged gear wheel 6 in the second compartment 5 generates lubricating fluid splashing that keeps transmission parts lubricated. As a drawback, fluid splashing is the main responsible for power losses. For this reason, stiffening ribs (here not shown) along sidewalls of the fluid sump are arranged to channel the lubricating fluid dripping along the sidewalls towards the first compartment 3. A back flow of the lubricating fluid 2 from the first reservoir 3 to the second reservoir 5 is regulated by the floating element 10. The size of the ball-shaped floating element 10 and the size of the first opening 8 are adjusted such that a sealing between the first compartment 3 and the intermediate compartment 4 is guaranteed whichever hydrostatic head is present in the first compartment 3, provided the floating element 10 is fully submerged.

In the initial transient, as shown in FIG. 2B lubricating fluid level 2a in the first compartment 3 raises whereas lubricating fluid level 2b in the intermediate compartment 4 drops up to the level where the floating element 10 loses buoyancy, opens the first opening 8 and introduces lubricating fluid from the first compartment 3 into the intermediate compartment 4. This mechanism keeps a constant hydrostatic head on the second opening 9, being the floating element 10 the valve itself. This constant hydrostatic head depends only on the lubricating fluid level 2b in the intermediate compartment 4, since the lubricating fluid's free surfaces in the three compartments 3, 4, 5 are all exposed to the same pressure, e.g. the pressure imposed by a transmission breather.

Furthermore, provided a volume of the intermediate compartment 4 is small enough, a hydrostatic head on the second opening 9 is nearly independent from transmission tilt, hence from the slope where the vehicle is eventually operated. The lubricating fluid flow rate processed by the gear wheel 6 in the second compartment 5 is upper limited by an area the second opening 9 and the hydrostatic head on it. Its value can be calculated using the well-known equation for the volumetric flow through an orifice. An upper limit to the lubricating fluid flow scattered all around by the gear wheel 6 in the second compartment 5 is ultimately an upper saturation on lubricating fluid splashing related transmission power losses (Power losses are saturated with a natural feedback).

In an extreme cold environment, the second opening 9 could excessively limit the lubricating fluid flow rate. This drawback can be easily remedied by a passive thermostatic valve. However, the present disclosure concentrates on providing a method to reduce the splashing power losses once the lubricating fluid reaches a reasonably high temperature. For most commercial oils, above 55° C., a theoretical flow coefficient through an orifice Cd is steady between 0.7 and 0.8.

FIG. 3 shows a frontal view of a section of a gearbox comprising a fluid sump 1 according to a second embodiment of the present disclosure. FIG. 4 shows a perspective view of the section of FIG. 3. The gearbox comprises a housing 11 with a shaft 12 extending therethrough. The lower part of the housing 11 is formed by the fluid sump 1. The fluid sump 1 of FIG. 3 is similarly constructed as the fluid sump 1 of FIGS. 2A and 2B. The fluid sump comprises a first compartment 3, an intermediate compartment 4 and a second compartment 5. The intermediate compartment 4 is separated from the first compartment 3 by a box-shaped partition wall 3a. Moreover, the intermediate compartment 4 is separated from the second compartment 5 by flat partition wall 5a which extends from the bottom of the housing 11 over the shaft 12. Since the intermediate compartment 4 has the form of a small box which is disposed at the bottom of the housing 11, in the upper part of the housing 11 the partition wall 5a directly separates the first and second compartment 3 and 5 from one another. The intermediate compartment comprises a first opening 8 which is disposed within an upper side of the first partition wall 3a and a second opening 9 which is disposed in the second partition wall 5a at the bottom of the housing 12. In the intermediate compartment 4 a floating element 10 is disposed for opening and closing the first opening 8. The intermediate compartment 4 is box-shaped and its inner width basically equals a diameter of the floating element 10 such that the floating element 10 is guided by both partition walls 3a and 5a during an opening or closing process. A lowest gear wheel 6 is arranged in the second compartment 5 for contacting a lubricating fluid (not shown in FIGS. 3 and 4).

Lubricating fluid is collected and stored in the first compartment 3 thanks to the lubricating fluid splashing generated by the submerged gear wheel 6 in the second compartment 5. From the first compartment 3 the lubricating fluid is sent back to the second compartment 5 passing through the intermediate compartment 4, that, thanks to the floating element 10, controls the hydrostatic head on the second opening 9 towards the second compartment 5. This ensures a lubricating fluid level in the second compartment 5 independent from the lubricating fluid volume in the first compartment 3.

Figure 6:
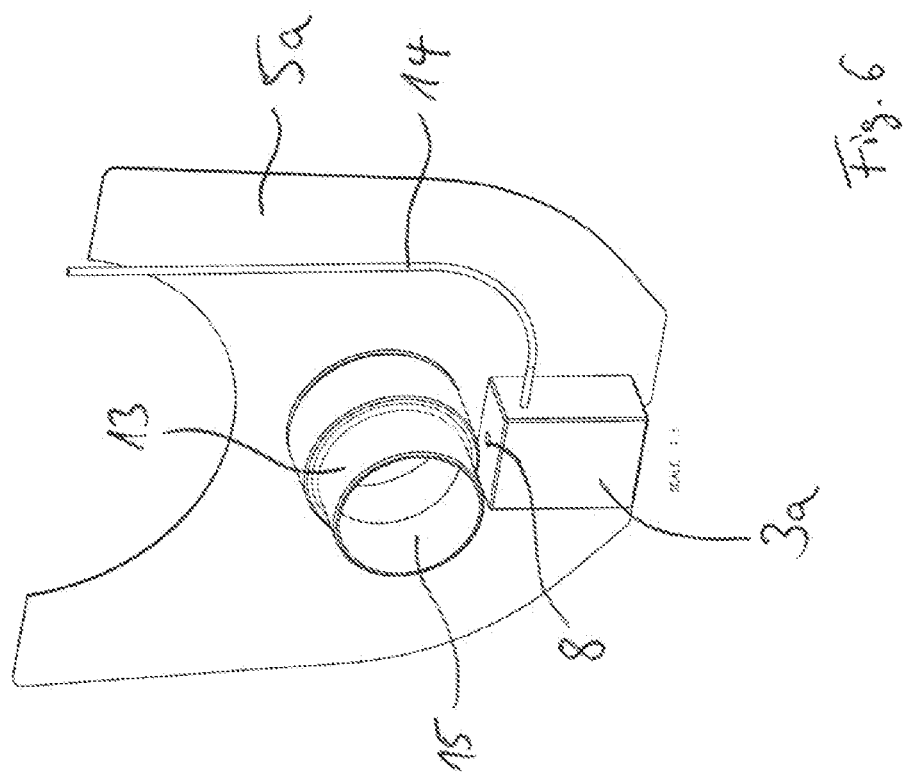
FIG. 6 shows a detailed perspective view of the second partition wall of the fluid sump of FIG. 4 as viewed from the first compartment.
Figure 5:
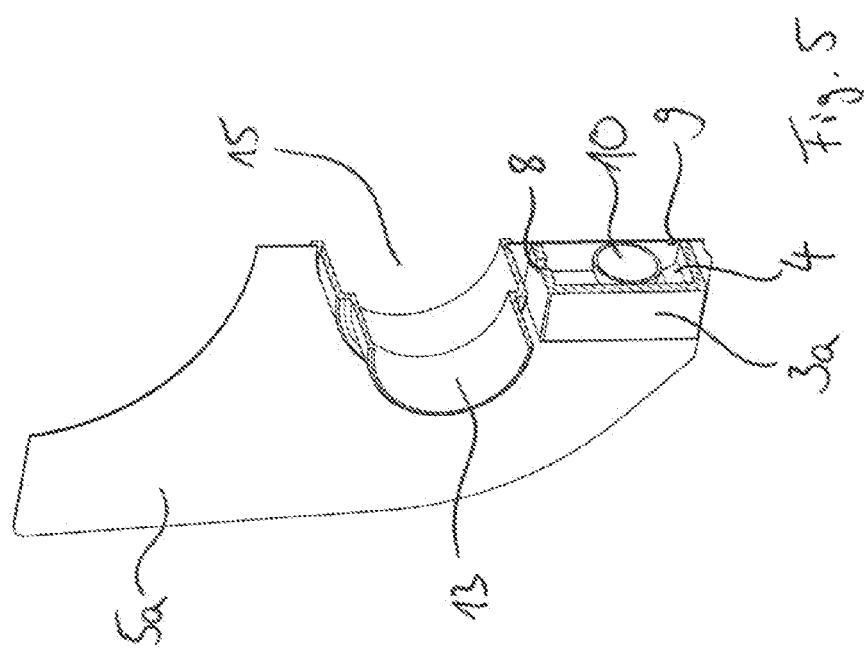
FIG. 5 shows a detailed perspective view of a section through the second partition wall and the intermediate compartment of the fluid sump of FIG. 4.

FIG. 5 shows a detailed perspective view of a section through the second partition wall 5a and the intermediate compartment 4 of the fluid sump 1 of FIG. 4. FIG. 6 shows a detailed perspective view of the second partition wall 5a of the fluid sump 1 of FIG. 4 as viewed from the first compartment 3. Tube 13 encloses the shaft 12 (not depicted here) to avoid leakage of the lubricating fluid through a shaft opening 15 in which usually the shaft 12 is inserted. The box-shaped intermediate compartment 3a bordered by the first and second partition wall 3a and 5a surrounds the second opening 9 to allow a constant hydrostatic head on it. The control of the lubricating fluid level in the intermediate compartment 4 is passive: opening and closing of the first opening 8 is demanded to the floating element 10. Tube 14 is mounted to the first partition wall 3a and fluidly connects the intermediate compartment 4 with an ambient pressure.

FIGS. 7 and 8 show a working principle of the floating element 10 of the fluid sump 1 according to the second embodiment. FIGS. 7 and 8 show a frontal view on the section through the second partition wall 5a and the intermediate compartment 4. The floating element 10 seals the first opening 8 when the intermediate compartment 4 is full of lubricating fluid 2 keeping the hydrostatic head on the second opening 9 independent from the total amount of lubricating fluid 2. At the same time, when the intermediate compartment 4 is not completely filled, the floating element 10 loosing buoyancy allows lubricating fluid 2 flow from the first compartment 3 to the intermediate compartment 4 ensuring the lubrication of the transmission. Tube 14 is fundamental to keep the intermediate compartment at ambient pressure.

As described above, a methodology has been highlighted to limit the power losses due to lubricating fluid splashing. A by-product of the three-compartment implementation, provided a volume of the intermediate compartment is small enough compared to the first compartment, is a splashing nearly independent from transmission tilt angle. This means that lubrication is guaranteed at whichever slope the vehicle is operated. In certain Off-Highway applications this feature is essential.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A fluid sump for accommodating a lubricating fluid, comprising:
    a first compartment for collecting the lubricating fluid;
    a second compartment in which the lubricating fluid is able to be brought into contact with a rotating member;
    an intermediate compartment having a first opening for introducing the lubricating fluid from the first compartment into the intermediate compartment, a second opening for introducing the lubricating fluid from the intermediate compartment into the second compartment, and a floating element; and
    a first partition wall separating the first compartment and the intermediate compartment from one another and containing the first opening such that, upon regular use of the fluid sump, the lubricating fluid is able to pass the first opening in a basically vertical first flow direction, wherein
    the first opening is configured such that the first opening is able to be opened and closed by the floating element, and wherein
    the first compartment, the intermediate compartment and the second compartment are provided with ambient pressure.

2. The fluid sump according to claim 1, wherein the fluid sump is for use in an area of a vehicle transmission.

3. The fluid sump according to claim 1, comprising a second partition wall separating the intermediate compartment and the second compartment from one another and containing the second opening such that, upon regular use of the fluid sump, the lubricating fluid is able to pass the second opening in a basically horizontal second flow direction.

4. The fluid sump according to claim 3, wherein the second opening is disposed within the second partition wall at a distance to the first opening which substantially corresponds to a height of the intermediate compartment.

5. The fluid sump according to claim 1, wherein a diameter of the second opening is smaller than or equal to 10 mm and/or larger than or equal to 2 mm, or smaller than or equal to 8 mm and/or larger than or equal to 2.5 mm.

6. The fluid sump according to claim 1, wherein dimensions of the intermediate compartment and the floating element are defined such that a length and a width of the floating element is basically equal to an inner length and an inner width of the intermediate compartment.

7. The fluid sump according to claim 1, wherein the floating element is ball-shaped or ellipsoid-shaped.

8. The fluid sump according to claim 1, further comprising a hollow tube which is fluidly connected with the intermediate compartment for equalizing a pressure within the intermediate compartment with ambient pressure.

9. The fluid sump according to claim 1, further comprising a thermostatic valve disposed within the second opening for controlling a lubrication fluid flow from the intermediate compartment to the second compartment according to a lubrication fluid temperature.

10. The fluid sump according to claim 1, wherein the intermediate compartment has a length between 1.5 and 2 times a main dimension of the floating element and/or a width comparable to the main dimension of the floating element.

11. A fluid sump for accommodating a lubricating fluid, comprising:
    a first compartment for collecting the lubricating fluid;
    a second compartment in which the lubricating fluid is able to be brought into contact with a rotating member; and
    an intermediate compartment having a first opening for introducing the lubricating fluid from the first compartment into the intermediate compartment, a second opening for introducing the lubricating fluid from the intermediate compartment into the second compartment, and a floating element, wherein the first opening is configured such that the first opening is able to be opened and closed by the floating element, wherein
    the first compartment, the intermediate compartment and the second compartment are provided with ambient pressure, and wherein
    dimensions of the intermediate compartment and the floating element are defined such that a length and a width of the floating element is basically equal to an inner length and an inner width of the intermediate compartment.

12. A fluid sump for accommodating a lubricating fluid, comprising:

a first compartment for collecting the lubricating fluid;
a second compartment in which the lubricating fluid is able to be brought into contact with a rotating member;
an intermediate compartment having a first opening for introducing the lubricating fluid from the first compartment into the intermediate compartment, a second opening for introducing the lubricating fluid from the intermediate compartment into the second compartment, and a floating element, wherein the first opening is configured such that the first opening is able to be opened and closed by the floating element; and
a hollow tube which is fluidly connected with the intermediate compartment for equalizing a pressure within the intermediate compartment with ambient pressure, wherein
the first compartment, the intermediate compartment and the second compartment are provided with ambient pressure.

* * * * *